April 28, 1953     E. DURHAM     2,636,927
MOISTURE CONDENSATION DETERMINING APPARATUS
Filed May 16, 1950     2 SHEETS—SHEET 1
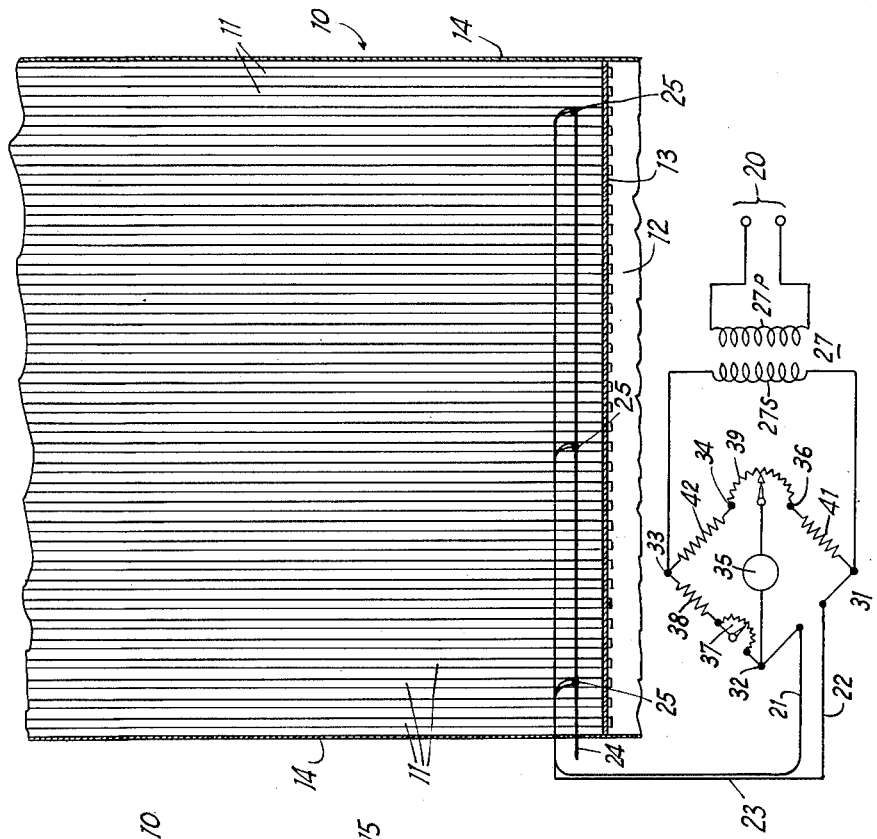
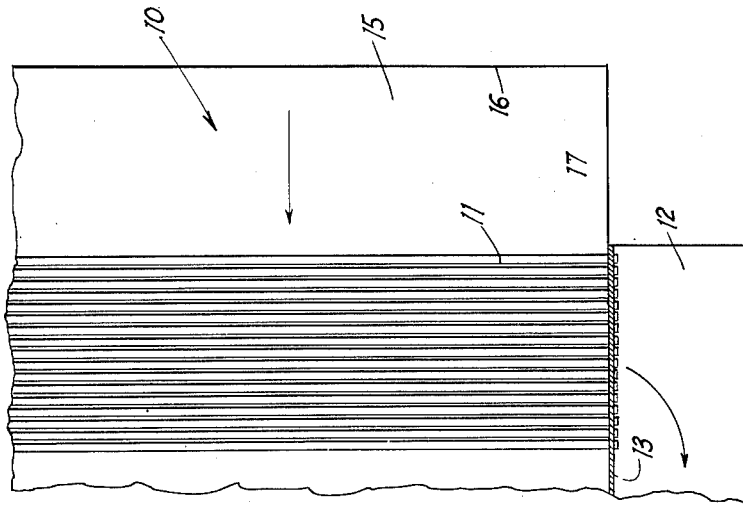
INVENTOR
*Edwin Durham*
BY
*J.P. Moran*
ATTORNEY April 28, 1953 E. DURHAM 2,636,927
MOISTURE CONDENSATION DETERMINING APPARATUS
Filed May 16, 1950 2 SHEETS—SHEET 2
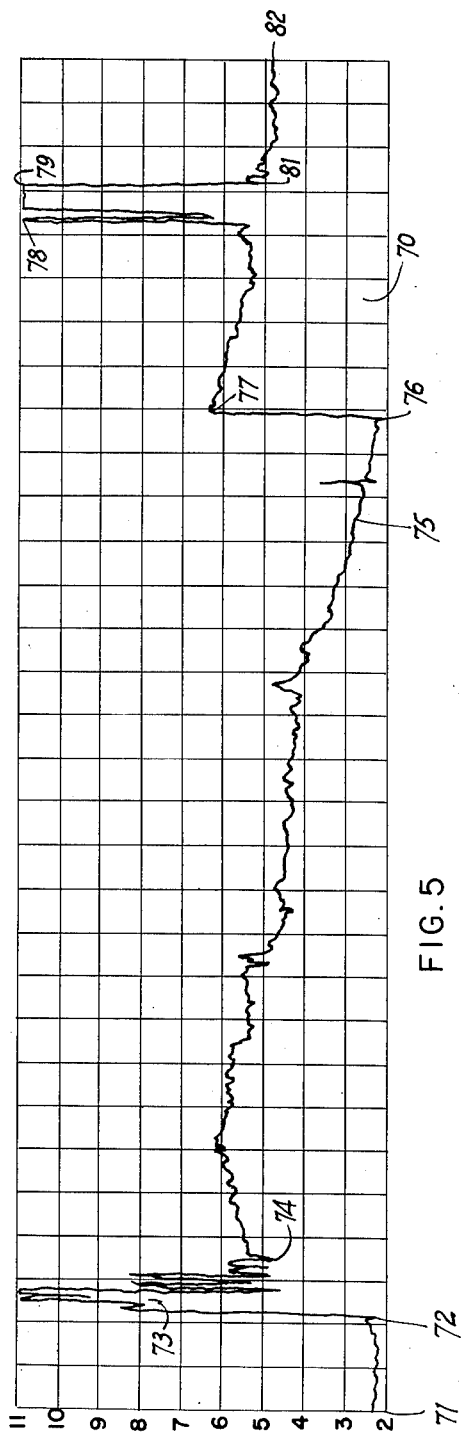
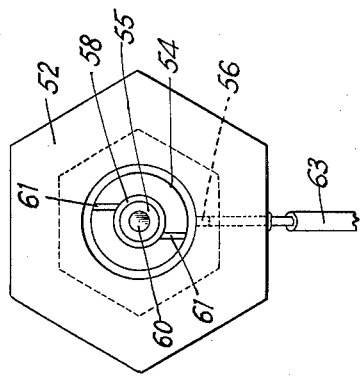
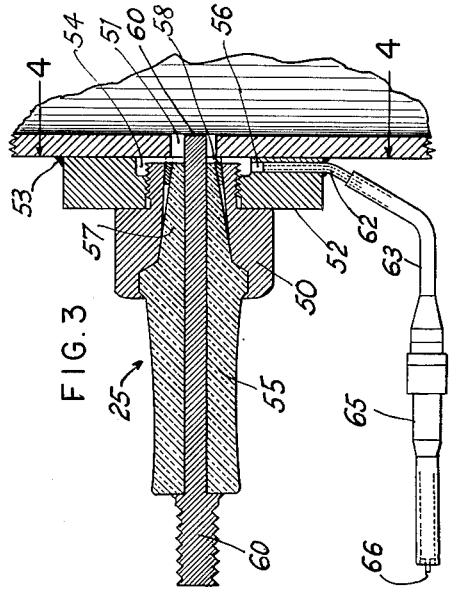
INVENTOR
*Edwin Durham*
BY
ATTORNEY Patented Apr. 28, 1953

2,636,927

UNITED STATES PATENT OFFICE 2,636,927

MOISTURE CONDENSATION DETERMINING APPARATUS

Edwin Durham, Westfield, N. J., assignor to The Babcock & Wilcox Company, New York, N. Y., a corporation of New Jersey Application May 16, 1950, Serial No. 162,203

10 Claims. (Cl. 175—183)

This invention relates to apparatus for indicating whether gases of a flowing stream have been cooled to or below their dew point and, more particularly, to an improved dew point indicator which may be used as an operating guide instrument in regulating the flow of a cooling medium in heat exchange relation to such flowing stream of gases. The apparatus is specifically applicable in the operation of an air heater of the recuperative metallic wall type, wherein it provides indications of the relative moisture content of the heated combustion gases giving up heat to the air, so that the rate of air flow may be regulated to maintain the temperature of the metallic surfaces confining combustion gases above the dew point of the combustion gases.

It is known that whether or not gases or a gaseous atmosphere are at or below their dew point may be determined by measuring the electrical conductivity of a dielectric surface separating a pair of electrodes to which a potential is applied, and which surface is in contact with the gases whose relation to their dew point is to be determined. At the dew point temperature of the gases, the gas and liquid particles are in equilibrium and a conductive film forms on the surface. The formation of this film provides a more highly conductive path between the electrodes. By connecting an indicating meter in the energizing circuit for the electrodes, the time at which the conductive film is formed will be indicated by a relatively sharp change in the indication of the meter.

Such instruments have, however, been suitable only for laboratory investigations, as they have involved a relatively elaborate set-up for providing a gas sample and directing this gas sample over the surface between the electrodes. In addition, they have usually included means for selectively varying the temperature of the dielectric surfaces. The forms of apparatus used have not been adapted for practical commercial use in industrial plants, particularly where a continuous observation of whether gases are above or at their dew point is required.

In the use of recuperative type air heaters of the tube or plate type in conjunction with steam boilers, it is customary to pass the heating gases leaving the boiler in counter-current relationship through tubes or between plates over which the air is caused to flow. The coldest air is thus in contact with the wall of the gas flow passage at a position near the gas outlet where the gas is at the minimum temperature. When the boiler unit is operated at full rated output, the weight and temperature of the gases delivered to the air heater are of such values that even though they give up considerable heat to the air they leave the air heater at temperatures materially above the dew point. However, when the rated output is reduced, the temperature of the gases entering the air heater is lower than at full load, and at relatively low loads are so low that they may leave the air heater at a temperature below their dew point.

Operating with gases at or below the dew point temperature flowing through the tubes is conducive to corrosion of the gas exposed tube walls due to attack by sulphuric acids resulting from the combination of condensed moisture from the gases and the sulphur oxides originating from the fuel combustion. Additionally a moist tube interior wall or plate wall collects dust and tends to build up a restriction to gas flow as well as an insulating layer as regards heat flow. From a standpoint of continued efficient operation and low maintenance costs, it is desirable to operate the air heater in a manner to avoid such conditions. This can be done by by-passing a portion of the air stream about the air heater or by raising the temperature of the air introduced to the inlet end of the air heater. While the above is old practice, it is difficult to know when to so modify the air flow because it is difficult to know when dew point conditions exist within the gas flow passages, inasmuch as these conditions vary with the chemical characteristics of the fuel, with the moisture content of the fuel, and the atmospheric humidity.

While it is possible to extract a sample of gas and determine its dew point, this temperature would not be of value as an operating guide inasmuch as an additional temperature determination of the gases within the gas flow passage would be necessary to determine if the determined dew point was in existence at the time.

The present invention provides an arrangement of apparatus for readily determining directly when the heat transmitting metal of the gas conducting passage is reduced to or below a temperature at which condensation from the gases occurs. It involves the mounting of conductivity measuring apparatus in the wall of the gas conducting passage to determine the existence of a moisture film.

The apparatus is also of value in determining the rate of accumulation of moist dust deposits which may occur with continued operation with air and gas flows which result in moisture deposit.

Accordingly, the present invention includes a pair of electrodes mounted in insulated relation with each other through the wall of the combustion gas tube and having a potential applied thereto from a Wheatstone bridge arrangement including an indicating meter. In a preferred example, the electrode assembly may be similar to an automotive sparkplug, thus comprising a central electrode and an annular electrode insulated from and embracing the central electrode. The space between the two electrodes is preferably enclosed by a suitable dielectric on which the aforementioned conductive film may form when the gas temperature is at or below the dew point. For the purpose of maintaining the assembly in operative relation through the tube wall, a washer or similar means may be welded to the external surface of the wall surrounding an aperture therethrough. The electrode assembly may be easily removed and replaced by simply screwing it into or out of the washer, the relative dimensions being such that the inner electrode extends through the aperture to substantially the plane of the inner surface of the combustion gas tube.

In operation, a potential is applied to the electrodes through the bridge circuit, and the latter is adjusted to a balance point without any gas flowing through the tube. The indicating meter will have a certain reading at such balance point. When gas flows through the tube, any formation of a film between the two electrodes will cause an unbalancing of the bridge which will result in a change of the meter reading. Thus, variation of the temperature of the gases from above to below the dew point is effectively indicated.

With the electrode assembly thus mounted in situ through the wall of a combustion gas passage in a recuperative type air heater, the assembly is subjected to the flow of dirty gas through the passage, and periodic cleaning of the electrodes is needed. For this purpose the present invention incorporates means for directing air blasts over the electrodes at periodic intervals to clean and dry the same. This means may include a chamber in the washer having air outlet passages for directing air in preferably tangential relation to the electrode surfaces. This chamber is connected to a conduit which may have its outer end provided with a special check valve of the type commonly used for inflating pneumatic tires. With this arrangement, the cleaning air blast can be effectively provided by means of a compressed air pump, such as a tire pump, connected to the valve. When the tire pump is disconnected, the valve automatically closes in the usual manner, so that no air will enter the tube through the air blast arrangement.

For a complete understanding of the invention principles, reference is made to the following detailed description of a typical embodiment thereof as illustrated in the accompanying drawings.

In the drawings:

Fig. 1 is a transverse partial sectional view of a section of a recuperative type metallic tube air heater, somewhat schematically illustrating the invention as applied to the determination of condensation of moisture from combustion gases flowing through the heater tubes;

Fig. 2 is a left end view of the air heater as shown in Fig. 1;

Fig. 3 is an enlarged sectional view illustrating the electrode assembly and the air blast cleaning means therefor;

Fig. 4 is a view on the line 4—4 of Fig. 3; and

Fig. 5 is a view of a portion of an actual chart taken from a recording conductivity meter used with the arrangement shown in Figs. 1 through 4.

Referring to Figs. 1 and 2, the invention is illustrated as applied to determine condensation of moisture from combustion gases flowing through metallic tubes 11 of a recuperative air heater 10. The combustion gases enter the upper ends of tubes 11, from a furnace or superheater outlet or the like, and flow downwardly through the tubes to a chamber 12 defined by a lower header or tube sheet 13. From chamber 12, the combustion gases flow to a stack, for example.

Tubes 11 are mounted in upper and lower tube sheets which with sidewalls 14, end wall 16, and bottom wall 17 define the casing of air heater 10. Air is delivered, from a forced draft fan (not shown), to chamber 15 defined by walls 14, 16 and 17, from which the air flows across tubes 11 for extracting heat from combustion gases flowing through tubes 11. The thus heated air is delivered from heater 10 to a furnace combustion chamber, for example.

The moisture determining apparatus of the invention, in the particular embodiment illustrated in Figs. 1 and 2, includes electrode assemblies 25, shown as three in number, each mounted through the wall of a tube 11. The bank of tubes 11 immediately adjacent chamber 15 is at the lowest temperature during operation of heater 10, as the air from chamber 15 is coldest at its entry into the tube bank. Thus, the air being at a relatively low temperature at this point, extraction of heat from the combustion gases is correspondingly at a maximum in the first, or entrance, bank of tubes 11. Consequently, other conditions being equal, the combustion gases flowing through the first bank of tubes 11 will have the maximum heat extracted therefrom and will correspondingly be at the lowest relative temperature.

Correspondingly, in all of the tubes 11, the combustion gases are at a substantially lower temperature adjacent the lower or exit ends of the tubes, due to the gases having their heat content continuously extracted by the colder air as the gases flow from the entry to the exit ends of tubes 11. Consequently, condensation of moisture from the combustion gases, and resulting corrosion of tubes 11, usually occurs first in the air entry bank of tubes 11 and adjacent the gas exit ends of the tubes of the first or entry bank. Thus, the electrode assemblies 25 are located in the first bank of tubes 11 and adjacent the exit ends of the tubes.

A potential is applied across the electrodes of assemblies 25 from a source, indicated at terminals 26, through a transformer 27 and a resistance bridge 30. Bridge 30 has a Wheatstone arrangement, and a suitable indicating instrument 35, such as a galvanometer, potentiometer, conductivity meter, or recording conductivity meter, is connected across a bridge diagonal, a recording conductivity meter being preferred.

The potential on assembly 25 is derived between points 31 and 32 of the bridge, a potentiometer 37 and a fixed resistance 38 being connected in series between points 32 and 33. Conductors 21, 22, connected into a two-conductor cable 23, serve to connect bridge 30 to the assemblies 25, and an air blast tube 24 serves to direct cleaning air blasts onto the electrodes. The secondary 27S of transformer 27 is connected to points 31 and 33. Fixed resistances 41 and 42 are connected, respectively, between points 31, 36 and 33, 34, points 34 and 36 being inter-connected by a variable resistance 39. Instrument 35 is connected between point 32 and the adjustable arm of resistance 39.

With the described arrangement, and with a potential applied to bridge 30 with no gas flow through tubes 11, potentiometer 37 and resistance 39 are adjusted to balance bridge 30 to a point where meter 35 indicates either zero or a predetermined figure representing the minimum conductivity or maximum impedance across the electrodes of assemblies 25. When the combustion gases flow through tubes 11, and across the electrodes of assemblies 25, there will be a variation in the conductivity or in the impedance across the electrodes if the gases are cooled to or below their dew point. The variation unbalances arm 31—32 of bridge 30, resulting in a change in the reading of meter 35. The change in the meter reading is a direct indication that the gases are at or below their dew point.

The detailed construction of electrode assemblies 25 will be best understood by reference to Figs. 3 and 4. It will be noted that assembly 25 is essentially similar to an automotive spark plug and, in practice, a modified spark plug may be used to constitute the assembly. Tube 11 has a radial aperture 51 and a metal washer 52 is mounted on the wall in axial alignment with aperture 51, being secured to tube 11 by suitable means such as weld 53. For a purpose to be described, washer 52 has an internal annular recess 54 adjacent tube 11 and a passage 56 extends through the washer from recess 54 to the outer surface thereof. Washer 52 is threaded to receive electrode assembly 25.

The latter includes an outer annular electrode 50, preferably having a polygonal periphery for reception of a wrench, and which is threaded into washer 52. An insulator 55 is mounted in electrode 50 and supports a central electrode 60 in axially centered relation through electrode 50. The inner end of insulator 55 is tapered, as at 57, so that it is spaced from electrode 50, and the space between electrode 50 and insulator 55 is filled with a tapered washer or spacer 58 to prevent entry of foreign matter between the insulator and the outer electrode. The inner end of electrode 50 is substantially flush with the inner surface of tube 11.

Passages 61, 61 are formed in the inner end of electrode 50 and extend in directions tangential to electrodes 50 and 60. These passages connect annular recess 54 to the space between electrodes 50 and 60, for the purpose of directing air blasts onto the electrodes to clean and dry the same.

The air blasts are provided in the following manner. A nipple 62 is brazed or soldered into passage 56, extending outwardly therefrom. A conduit 63 connects the outer end of nipple 62 to a valve 65, which is of the type commonly used for inflating pneumatic tires and has a stem 66. Valve 65, in practice, may be on the outer end of conduit 24 and conduits 63 may be connected to conduit 24. To clean the electrodes, an ordinary bicycle pump is secured to the end of valve 65 and air is pumped through the conduits 63 and nipple 62 into recess 54. The air under pressure is directed by passages 61 tangentially onto the two electrodes to clean dust or the like from the latter. In the usual manner, when the compressed air pump is disconnected, valve 65 automatically closes to seal recess 54 from atmosphere.

Fig. 5 illustrates a typical chart 70 taken from recording conductivity meter 35, the chart moving from right to left with conductivity between the electrodes of assemblies 25 being plotted as a function of time, as indicated by pen line 75. Beginning at the left end of chart 70, pen line 75 indicates a generally uniform and low, but somewhat rising conductivity of electrode assemblies 25, as indicated from point 71 to point 72. Between points 72 and 73, the conductivity decreased sharply as the electrodes were cleaned by a compressed air blast, the conductivity decreasing sharply right after the cleaning. Soot was blown from tubes 11 immediately before the electrode cleaning, resulting in an increase in conductivity between the electrodes as indicated between points 73 and 74. Between points 74 and 76, the conductivity has a decreasing trend, approaching substantially a zero value at point 76.

At this latter point, the electrode assemblies were again cleaned by an air blast, resulting in an increase in conductivity to point 77. Thereafter the conductivity decreased to point 78, where blowing of soot from tubes 11 commenced. The conductivity increased sharply, during such soot blowing, between points 78 and 79, dropping sharply as the blowing was terminated at the latter point. Thereafter, the conductivity continued its interrupted decreasing trend, as indicated between points 81 and 82. The chart 70 represents readings over a period of about 14 hours.

While a specific embodiment of the invention has been shown and described in detail to illustrate the application of the invention principles, it will be understood that the invention may be otherwise embodied without departing from such principles.

I claim:

1. Apparatus for determining condensation of moisture from gases flowing along a confined path comprising, in combination, a mounting supporting a pair of electrodes disposable in spaced cooperable relation in the flowing gases; means for applying a potential to said electrodes; current measuring means in circuit relation with said electrodes to measure the conductivity of the gap between the electrodes as a function of moisture condensed from the gases; passage means formed in said mounting and directed towards said electrodes; and selectively operable air blast means associated with said passage means and operable to direct a blast of air therethrough and over the electrodes to clean foreign matter from the electrodes.

2. Apparatus for determining condensation of moisture from gases flowing along a confined path comprising, in combination, a mounting supporting a pair of electrodes disposable in spaced cooperable relation in the flowing gases; means for applying a potential to said electrodes; a conductivity meter in circuit relation with said electrodes to measure the conductivity of the gap between the electrodes as a function of moisture condensed from the gases; passage means formed in said mounting and directed towards said electrodes; and selectively operable air blast means associated with said passage means and operable to direct a blast of air therethrough and over the electrodes to clean foreign matter from the electrodes.

3. Apparatus for determining condensation of moisture from gases flowing along a confined path comprising, in combination, a mounting supporting a pair of electrodes disposable in spaced cooperable relation in the flowing gases; means for applying a potential to said electrodes; a recording conductivity meter in circuit relation with said electrodes to measure the conductivity of the gap between the electrodes as a function of moisture condensed from the gases; passage means formed in said mounting and directed towards said electrodes; and selectively operable air blast means associated with said passage means and operable to direct a blast of air therethrough and over the electrodes to clean foreign matter from the electrodes.

4. Apparatus for determining condensation of moisture from gases flowing through a metallic tube comprising, in combination a mounting secured in fluid sealing relation relative to an aperture in the tube wall; an electrode supported in insulated relation in said mounting to project therefrom centrally through the aperture in insulated relation to the wall and having its inner end exposed to the flowing gases; means for applying a potential between said electrode and the tube wall; current measuring means in circuit relation with said electrode and wall to measure the conductivity of the gap between the electrode and wall as a function of moisture condensed from the gases; passage means formed in said mounting and directed towards said electrodes; and selectively operable air blast means associated with said passage means and operable to direct a blast of air therethrough and over the electrode to clean foreign matter from the electrode.

5. Apparatus for determining condensation of moisture from gases flowing through a metallic tube comprising, in combination an electrode assembly comprising a central electrode and an annular electrode surrounding said central electrode and insulated therefrom, said assembly being mounted radially through the tube wall with the inner ends of the electrodes in contact with the flowing gases; means for applying a potential to said electrodes; current measuring means in circuit relation with said electrodes to measure the conductivity of the gap between the electrodes as a function of moisture condensed from the gases; passage means formed in said assembly and directed toward said electrodes; and selectively operable air blast means associated with said passage means and operable to direct a blast of air therethrough and over the electrodes to clean foreign matter from the electrodes.

6. Apparatus for determining condensation of moisture from gases flowing through a metallic tube comprising, in combination an electrode assembly comprising a central electrode and an annular electrode surrounding said central electrode and insulated therefrom, said assembly being mounted radially through the tube wall with the inner ends of the electrodes in contact with the flowing gases; means for applying a potential to said electrodes; current measuring means in circuit relation with said electrodes to measure the conductivity of the gap between the electrodes as a function of moisture condensed from the gases; tangential air passages formed through said annular electrode; and air blast means communicating with such passages to direct an air blast therethrough to clean foreign matter from said electrodes.

7. Apparatus for determining condensation of moisture from gases flowing through a metallic tube comprising, in combination an electrode assembly comprising a central electrode and an annular electrode surrounding said central electrode and insulated therefrom; a metal washer secured to the outer surface of the tube coaxially with a radial aperture through the tube wall; said annular electrode being threaded into said washer and said central electrode projecting through the wall aperture; means for applying a potential to said electrodes; current measuring means in circuit relation with said electrodes to measure the conductivity of the gap between the electrodes as a function of moisture condensed from the gases; said washer having an annular recess surrounding the inner end of said annular electrode; tangential air passages formed through said annular electrode and opening into the recess; and air blast means in communication with the recess to direct an air blast through the passages to clean foreign matter from said electrodes.

8. Apparatus for determining condensation of moisture from gases flowing through a metallic tube comprising, in combination an electrode assembly comprising a central electrode and an annular electrode surrounding said central electrode and insulated therefrom; a metal washer secured to the outer surface of the tube coaxially with a radial aperture through the tube wall; said annular electrode being threaded into said washer and said central electrode projecting through the wall aperture; means for applying a potential to said electrodes; current measuring means in circuit relation with said electrodes to measure the conductivity of the gap between the electrodes as a function of moisture condensed from the gases; said washer having an annular recess surrounding the inner end of said annular electrode; tangential air passages formed through said annular electrode and opening into the recess; a conduit communicating with the recess; a check valve disposed in said conduit; and air pressure means connectible to the outer end of said conduit to direct an air blast through the passages to clean foreign matter from said electrodes.

9. An operating guide instrument for regulation of the temperature and rate of flow of air in a recuperative metallic wall air heater having a metallic tube combustion gas passage over which the air flows to extract heat from the gases through the tube wall, comprising, in combination, a mounting secured in fluid sealing relation relative to an aperture in the tube wall; an electrode supported in insulated relation in said mounting to project therefrom centrally through the aperture in insulated relation to the wall and having its inner end exposed to the flowing gases; means for applying a potential between said electrode and the tube wall; current measuring means in circuit relation with said electrode and wall to measure the conductivity of the gap between the electrode and wall as a function of moisture condensed from the gases; passage means formed in said mounting and directed toward said electrode; and selectively operable air blast means associated with said passage means and operable to direct a blast of air therethrough and over the electrode to clean foreign matter from the electrode.

10. An operating guide instrument for regulation of the temperature and rate of flow of air in a recuperative metallic wall air heater having a metallic tube combustion gas passage over which the air flows to extract heat from the gases through the tube wall, comprising, in combination, an electrode assembly comprising a central electrode and an annular electrode surrounding said central electrode and insulated therefrom, said assembly being mounted radially through the tube wall with the inner ends of the electrodes in contact with the flowing gases; means for applying a potential to said electrodes; current measuring means in circuit relation with said electrode and wall to measure the conductivity of the gap between the electrode and wall as a function of moisture condensed from the gases; passage means formed in said assembly and directed toward said electrodes; and selectively operable air blast means associated with said passage means and operable to direct a blast of air therethrough and over the electrodes to clean foreign matter from the electrodes.

EDWIN DURHAM.

References Cited in the file of this patent

UNITED STATES PATENTS

| Number | Name | Date |
| --- | --- | --- |
| 1,524,937 | Keeler | Feb. 3, 1925 |
| 1,930,831 | Webb | Oct. 17, 1933 |
| 2,015,125 | Polin | Sept. 24, 1935 |
| 2,377,426 | Kersten | June 5, 1945 |
| 2,424,735 | Boothroyd | July 29, 1947 |
| 2,452,615 | Thomson | Nov. 2, 1948 |
| 2,492,768 | Schaefer | Dec. 27, 1949 |